J. A. EBERLE.
BABY WALKER.
APPLICATION FILED JUNE 27, 1918.
1,328,826.
Patented Jan. 27, 1920.
2 SHEETS—SHEET 1.
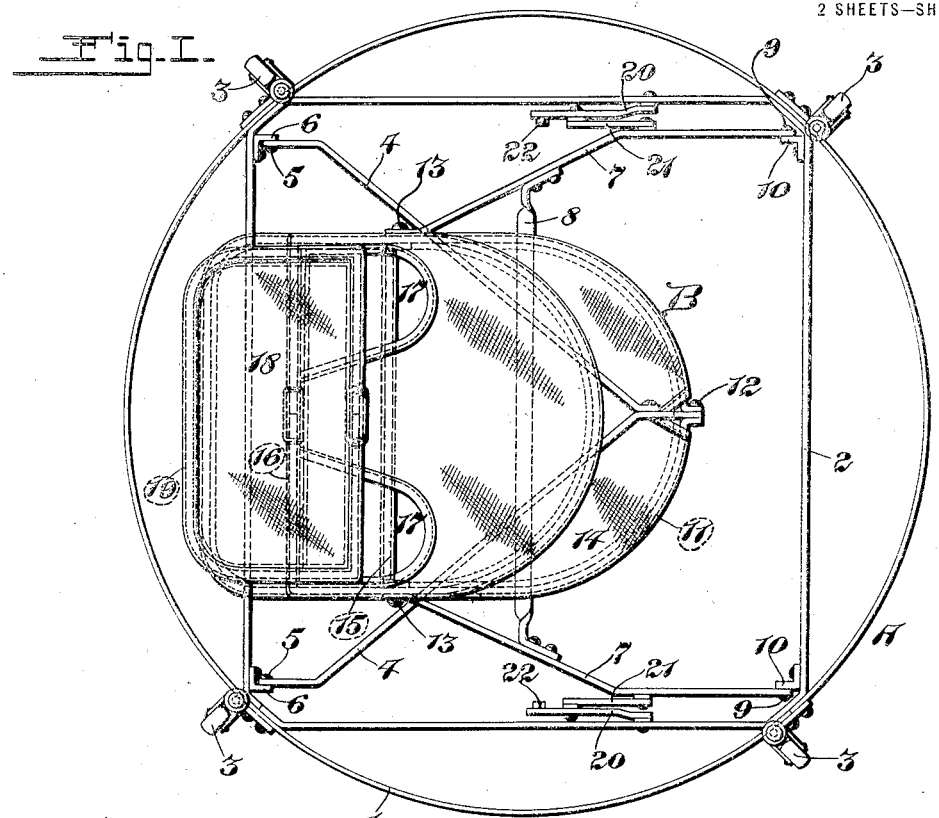
Fig. I.
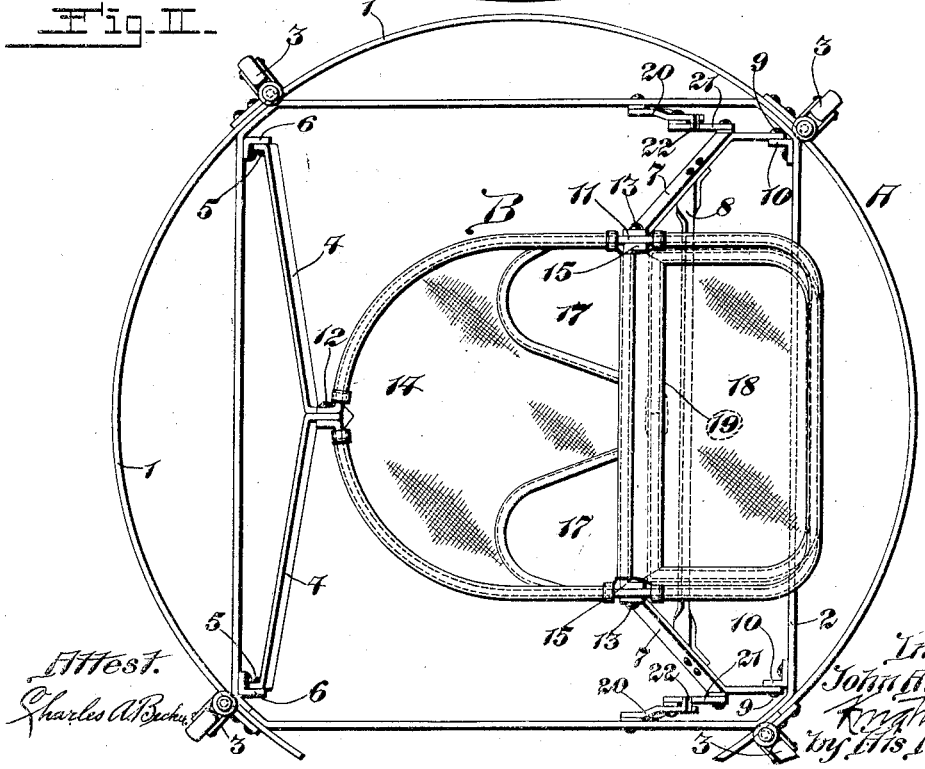
Fig. II.
Attest.
Charles A. Becker
Inventor:
John A. Eberle,
by his Attorneys

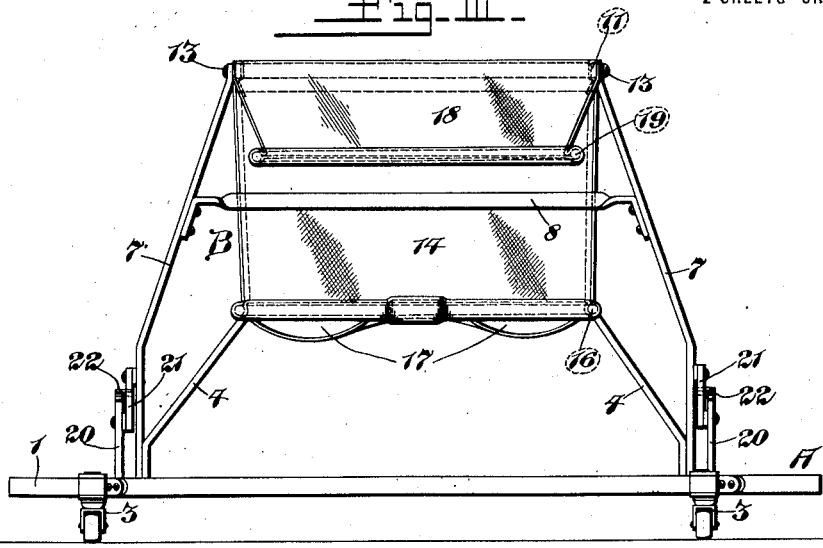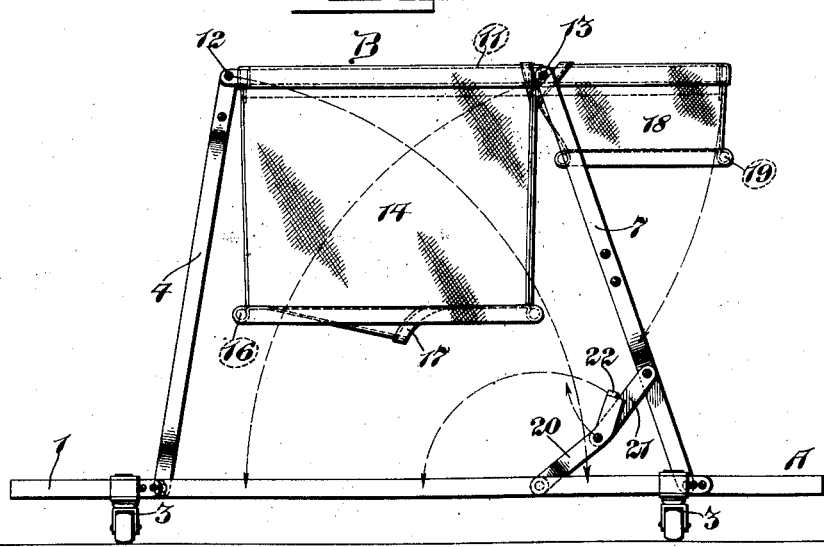

UNITED STATES PATENT OFFICE.

JOHN A. EBERLE, OF ST. LOUIS, MISSOURI.

BABY-WALKER.

1,328,826.     Specification of Letters Patent.     Patented Jan. 27, 1920.

Application filed June 27, 1918. Serial No. 242,252.

*To all whom it may concern:*

Be it known that I, JOHN A. EBERLE, a citizen of the United States of America, a resident of the city of St. Louis, State of Missouri, have invented certain new and useful Improvements in Baby-Walkers, of which the following is a full, clear, and exact description, reference being had to the accompanying drawings, forming a part of this specification.

My invention relates to an article for use by infants to assist them when learning to walk, and which includes a seat which is constantly available to the child and preferably has associated therewith a receptacle for playthings or other articles. In its preferred construction my baby walker comprises a plurality of elements pivotally connected to each other so that the entire article may be folded into small compass.

Figure I is a top view of my baby walker in folded condition.

Fig. II is a top view of the walker in unfolded condition.

Fig. III is a front elevation.

Fig. IV is a side elevation.

In the accompanying drawings, A designates the base of my baby walker, said base comprising an outer frame 1 preferably in the shape of a ring and an inner frame 2 preferably rectangular in shape. The base A is supported by casters 3 adapted to permit movement of the base in any direction in which it may be moved by a child occupying the walker.

4 designates a rear seat support connected by pivot pins 5 to the inner frame 2 of the base A, the said inner frame preferably including, or having secured to it, lugs 6 which receive the pivot pins 5. Said rear seat support comprises two divergent legs, the lower and separated ends of which receive the pivot pin 5. The upper ends of said legs are connected to each other and receive the attachment of a seat to be hereinafter described.

7 designates front seat supporting legs the upper ends of which receive the attachment of the hereinbefore mentioned seat. The legs 7 are joined to each other by a tie-bar 8 and their lower ends are connected by pivot pins 9 to the inner frame 2 of the base A, said pivot pins preferably being mounted in lugs 10 secured to the inner frame 2 of the base A.

B designates the seat of my baby walker. This seat comprises an upper or main frame 11 pivoted to the upper end of the rear seat support at 12 and to the front seat supporting legs 7 at 13. Said seat frame 11 preferably extends forwardly from the points of its pivotal connection to the front legs 7 for a purpose to be hereinafter explained.

A flexible seat pocket 14, preferably of cloth, is secured, at its upper margin, in any suitable manner to the portion of the seat frame 11 lying between the seat supporting members 4 and 7. The main seat frame includes a transverse cross bar 15 which receives the attachment of the seat pocket 14 to support its front portion. The seat pocket is thus suspended from the main frame and in the margin of the bottom of the pocket is a border ring 16 (see Figs. III and IV) which serves to hold the lower portion of the pocket distended. In the bottom of the seat pocket are openings 17 through which the legs of a baby occupying the seat may extend so that the baby may either stand or walk while in the seat pocket or be seated therein.

The forward extension of the main seat frame 11, that in front of the cross bar 15, constitutes a support for a receptacle pocket 18 of flexible material, preferably cloth; said receptacle pocket hanging from said extension and the cross bar 15, and being held distended at its bottom by a border ring 19. The receptacle pocket thus provided is always convenient for holding a baby's playthings or other articles for the baby's use and it does not in any way interfere with the use of the seat pocket 14.

For the purpose of retaining the seat supporting members 4 and 7 in unfolded positions while my baby walker is in service, I provide folding braces connecting either the front or rear supports to the base A. In the construction illustrated these braces are applied to the front seat supporting legs 7 and each brace comprises a bar 20 pivoted to the inner base frame 2 and a second bar 21 pivoted to a leg 7, the two bars being pivoted to each other so as to fold readily. One of the bars of each brace is furnished with a stop 22 which strikes the companion brace bar after the pivot connecting the bars has passed a dead center, thereby causing the brace to be held against accidental reverse or folding movement.

The movement of the parts of my baby walker in unfolding and folding it are indicated in Fig. IV. In folding the walker the brace comprising the bars 20 and 21 is first unlocked by a rearward and upward movement of the brace. The rear seat support 4 is next lowered, followed by lowering of the front seat supporting legs 7, and, as a consequence of the lowering of such parts, the seat is moved downwardly to the position shown in Fig. I. The unfolding of the walker is accomplished by reverse movements of the parts.

I claim:—

A foldable baby walker comprising a base, a seat frame above said base, jointless seat supports pivoted to said base and having unrestrained pivotal connection with said seat frame, thereby permitting free downward movement of said jointless seat supports in opposite directions in folding action, and means for holding said seat supports in elevated positions when the baby walker is unfolded.

In testimony that I claim the foregoing I hereunto affix my signature.

JOHN A. EBERLE.